United States Patent [19]

Huffman

[11] 4,154,746

[45] May 15, 1979

[54] ANTHRAQUINONE AMINO PLEOCHROIC DYES

[75] Inventor: William A. Huffman, Minneapolis, Minn.

[73] Assignee: Minnesota Mining and Manufacturing Company, Saint Paul, Minn.

[21] Appl. No.: 909,005

[22] Filed: May 24, 1978

Related U.S. Application Data

[62] Division of Ser. No. 786,489, Apr. 11, 1977, abandoned.

[51] Int. Cl.$^2$ .................. C07C 97/24; C07C 97/26; C09B 1/20; C09B 1/514
[52] U.S. Cl. .................................. 260/378; 260/380
[58] Field of Search .................. 260/378, 380, 566 F, 260/566 B

[56] References Cited

U.S. PATENT DOCUMENTS

| 1,930,351 | 10/1933 | Bamberger et al. ................ 260/378 |
| 4,078,086 | 3/1978 | Winkelmann et al. ............. 260/378 |

OTHER PUBLICATIONS

*Chemical Abstracts,* vol. 5, pp. 1749$^3$, "Action of Benzyl Chloride and Chloroacetic Acid on Aminoanthraquinone", Weitzenbock et al., Univ. Graz.

*Chemical Abstracts,* vol. 22, pp. 3408$^5$, "Anthraquinone Dichlorodiimene and Its Compounds with the Amines", A. A. Sanin, 1927.

*Primary Examiner*—Allen B. Curtis
*Assistant Examiner*—Raymond Covington
*Attorney, Agent, or Firm*—Cruzan Alexander; Donald M. Sell; Warren R. Bovee

[57] ABSTRACT

Anils of 1,4- and 1,8-diaminoanthraquinone with p-alkyl- and p-alkoxybenzaldehyde are found to be pleochroic dyes which form guest-host combinations with dielectrically positive anisotropic nematic liquid crystals. These combinations are of value in electro-optical display devices.

3 Claims, 14 Drawing Figures

ANTHRAQUINONE AMINO PLEOCHROIC DYES

This is a division of application Ser. No. 786,489 filed Apr. 11, 1977, now abandoned.

This invention relates to pleochroic anils of 1,4- and 1,8-diaminoanthraquinone with p-alkyl- and p-alkoxybenzaldehyde and to guest-host combinations thereof with dielectrically positive nematic liquid crystals. This invention further relates to electro-optical devices employing the said guest-host combinations.

Electro-optical devices in which liquid crystals are employed usually comprise two tranparent flat plates having very thin transparent electrodes on their inwardly facing surfaces, separated by from a few microns to a few tens of microns and with a liquid crystalline composition filling the space between the plates. It is these plates which are referred to below as walls of the vessel. Impressing an electric field on the liquid crystal affects the optical properties of the layer of liquid crystal.

It was discovered by Heilmeier and Zanoni, Applied Physics Letters, Vol. 13, page 91–92 (1968) that, when pleochroic dyes are combined with nematic liquid crystals in a device such as above, the pleochroic colors of the dye are manifested as an electric field is applied and released. The nematic liquid is referred to as the "host" and the pleochroic dye as the "guest" so that the composition is referred to as a guest-host combination. The phenomenon has been utilized in U.S. Pat. Nos. 3,551,026, 3,597,044 and 3,960,751 to produce electro-optical devices.

U.S. Pat. No. 3,551,026 employes substances, e.g., p-n-butoxybenzoic acid and butyl p-anisylideneaminocinnamate, which become nematic at relatively elevated temperatures and the device used therefore provides for heating although not requiring it. Methyl red and indophenol blue are used as pleochroic dyes.

U.S. Pat. No. 3,597,044 employes p-n-acyloxybenzylidene-p'-aminobenzonitriles as nematic liquid crystals with various pleochroic dyes and paticularly combinations of nematic liquid crystals which then have depressed crystal-nematic transition temperatures just above room temperature and may remain supercooled at room temperature.

U.S. Pat. No. 3,960,751 employes nematic liquid crystals having positive and negative dielectric anisotropy separately or together in different examples with novel pleochroic 1,4- and 1,8-bis(monoalkyl amino)anthraquinones either alone or in combinations with other pleochroic azo dyes.

In order for an electro-optical device employing nematic liquid crystals to be operable the liquid crystal must have an oriented structure which is controlled by the direction of an applied electric field. Liquid crystals (mesomorphic substances) tend to have rod-like molecules. When the long axes of the liquid crystals are perpendicular to the walls of the cell or vessel the structure is termed homeotropic. When the long axes of the lliquid are parallel to the walls of the cell or vessel the structure is termed homogeneous because of the homogeneous boundary conditions. When two homogeneously orienting walls are at right angles of lines of orientation a twisted nematic liquid crystalline structure is achieved.

Many nematic liquid crystals can be altered to a cholesteric phase by addition of a soluble optically active nematic liquid crystalline material as a dopant such as:

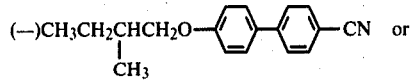

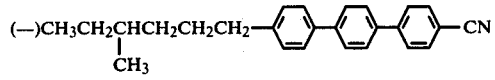

wherein the alkyl groups are active amyl and active heptyl. In such cases it is the axis of the helix of the cholesteric phase which is homeotropically or homogeneously oriented.

Homogeneous boundary conditions may be achieved by several techniques each of which offers advantages for certain purposes. These are well known in the art and do not need to be described in detail. Suitable techniques and references showing the procedure include:

1. rubbing, e.g. with aqueous suspension of very fine zirconium oxide in a single direction, cf. F. J. Kahn "Nematic Liqid Crystal Device" U.S. Pat. No. 3,694,053;
2. mechanical surface scribing or deformation, cf. D. W. Berrgman, Phys. Rev. Lett., Vol. 28, p. 1683 1972;
3. deposition of organic materials, such as trimethoxysilane, $R-Si(OCH_3)$ followed by rubbing as above, cf. F. J. Kahn, Appl. Phys. Lett., Vol. 22, p. 11 (2/1/73) and idem. Appl. Phys. Lett., Vol. 22, p. 386 (4/15/73);
4. deposition of inorganic materials such as metal oxides or $MgF_2$, vapor deposited at angles of 1°–30° to the coated surface, cf. J. L. Janning, Appl. Phys. Lett., Vol. 21, p. 173 (1972) or deposition at angles above 30° followed by rubbing.

Homeotropic boundary conditions, which are generally of less interest, are obtained, for example, by coating with metal oxides at angles well above 30° or treatment with surfactants.

Dielectrically positive anisotropy is exhibited by liquid crystals which tend to align longitudinally with an impressed field. Such compounds are of particular significance for guest-host combinations of the invention. It is usually only necessary that the overall effect is that of dielectrically positive anisotropy so that the liquid crystalline host may be composed of high percentages of dielectrically negative anisotropic materials with smaller amounts of highly dielectrically positive anisotropic materials.

Many pleochroic dyes which are useful in guest-host combinations also tend to have molecules elongated in one direction with little or no absorption along their long axis and absorption of light in various portions of the visible spectrum along the short axis. Other pleochroic dyes may align oppositely being colorless on the short and colored along the long axis. They are thus of two types.

When combined with nematic liquid crystals having a homeotropic structure, i.e. molecules perpendicular to walls of vessel, the first above type of pleochroic dye then aligns its rods with those of the host liquid crystal and no color is seen until an electric field is imposed. Correspondingly, when the same pleochroic dye is combined with a nematic liquid crystal having the twisted structure, the molecules are aligned parallel to the walls of the vessel and progressively at right angles and the combination appears colored until an electric field is applied.

By combining two pleochroic dyes, one each of the above two types, devices which change from one color to another are evidently possible. A further effect is obtained by incorporating an isotropic, i.e., non-pleochroic, dyestuff with a pleochroic dyestuff so that the colors of the two are additive at one stage and the isotropic dyestuff appears at the other stage of cycling the electric field.

In order that there be a cycle between colorless and colored or between two colors for a given device it is obviously imperative to employ the dye in amounts which are alignable by the nematic liquid crystal, i.e., not in excess of the proportions which are within the capabilities of alignment by the amount of liquid crystal present. This is usually found to be up to about 5% by weight. In some cases the solubility of the pleochroic dye in the liquid crystal is inadequate to achieve concentrations above 1-5% by weight. Combinations of the prior art are capable of achieving contrasts from zero to maximum electric field of about 2:1 up to about 4:1. It would be desirable to have greater solubilities and higher contrasts and these are therefore aims and objects of the inventions.

A very useful series of pleochroic dyes have been found wherein diaminoanthraquinone bisanils of the general formula

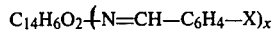

where $C_{14}H_6O_2$ is an anthraquinone radical having valences at 1,4 or 1,8, $C_6H_4$ is a p-phenylene and X is nitro, cyano, phenyl alkyl of 1-20 carbon atoms, alkoxy of 1 to 20 carbon atoms or di(lower alkyl)amino containing alkyl of 1-4 carbon atoms. These are found to form particularly useful guest-host combinations with typical, dielectrically positive anisotropic, nematic compounds or compositions such as N-p-hexylbenzylideneaminobenzonitrile or p-heptyl-4-cyanobiphenyl or compositions including these compounds in dominating amounts, i.e. providing net dielectrically positive anisotropy. It will be understood herein that positive anisotropy refers to dielectrically positive anisotropy. Compounds of the invention can be employed at up to equimolar proportions with the nematic compounds to obtain contrast ratios up to about 20:1 or more.

The compounds of the invention are further remarkable in providing exceptionally high values of the optical order parameter S. This parameter is a measure of the efficiency of orientation of a dye. It is determined by measuring absorption of light as the reciprocal of percent transmission at $\lambda_{max}$ through a liquid crystal solution of the dye between electrode-coated plates in a cell as described above with and without an impressed field. Where $A_1$ and $A_0$ are the absorption with and without field respectively, $$S = \frac{A_0 - A_1}{A_0 + 2A_1}$$

The parameter S is given as a decimal number less than 1. For a given dye it may vary somewhat depending on the particular nematic liquid crystal employed as host. Pleochroic dyes of the prior art provided values of S of the order of about 0.3 to 0.5. Compounds of the invention have optical order parameters of 0.5 and higher and in preferred compounds are 0.7 and higher. Values of 0.9 and higher are found for some particularly useful compounds. This is a very high range of values not to be expected from any prior art teachings.

The unusual properties of the instant pleochroic dyestuffs render them of value in combinations with nematic liquid crystals of net positive anisotropy in display devices as for calculators, watches, etc. and also for use as electronic shutters for devices such as cameras and projectors and by use in a specular arrangement they assist in providing mirrors which can pass from specular to transparent and can be employed in cameras or wherever mirrors are used.

Reference is now made to the several drawings herewith wherein

Figure 4:
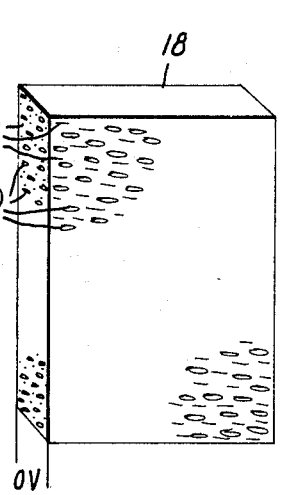
FIGS. 4 and 5 show combinations in guest host relationship of homogeneous positive anisotropic nematic liquid crystals and dyes of the invention without and with impressed voltage respectively.
Figure 5:
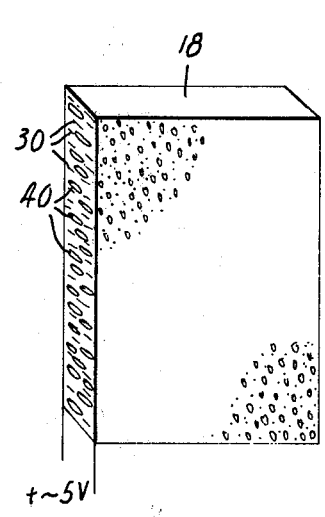
Figure 6:
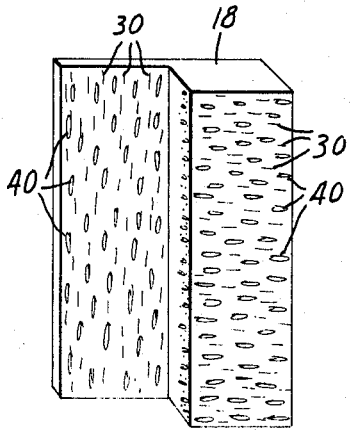
Figure 7:
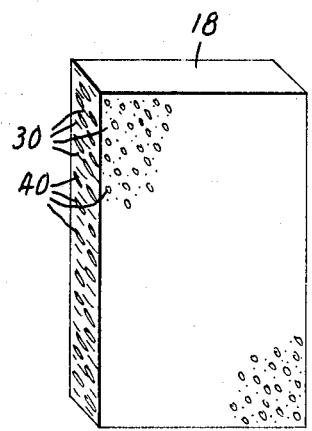
Figure 8:
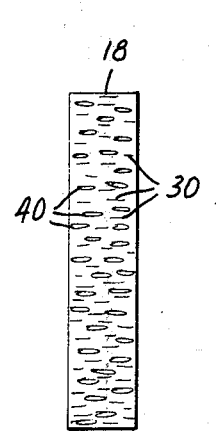

FIGS. 6, 7 and 8 show combinations of FIGS. 4 and 5 but with orientation of walls of cell at right angles giving twisted nematic liquid crystals. FIG. 6 is without and FIGS. 7 and 8 with impressed voltage.

Figure 9:
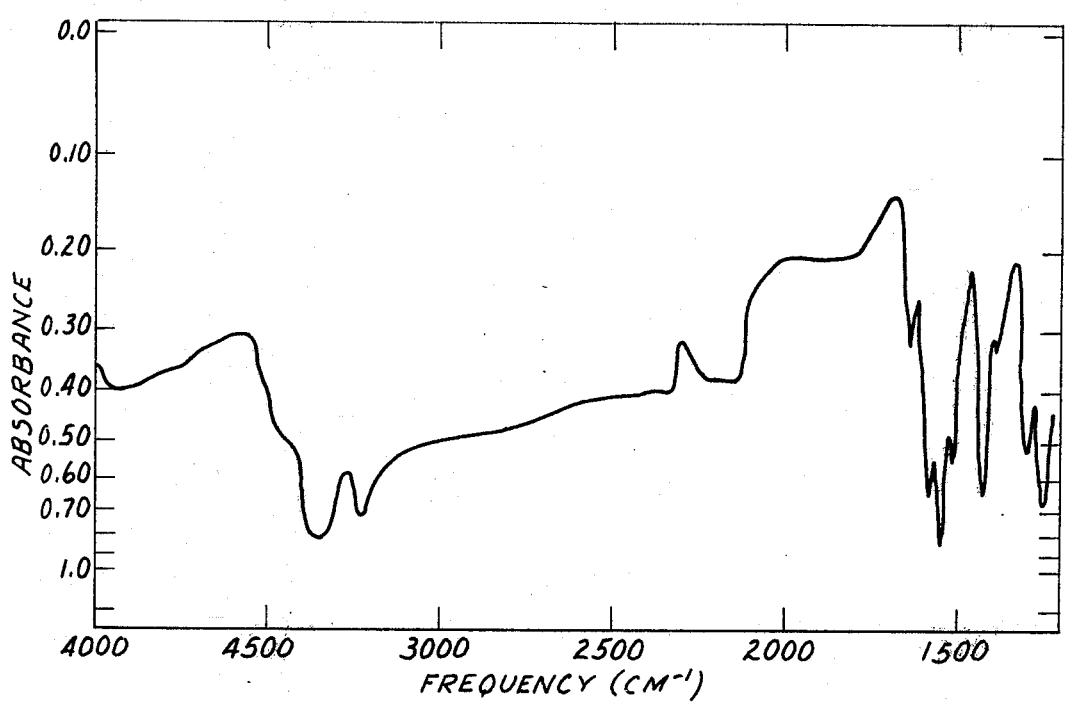
Figure 10:
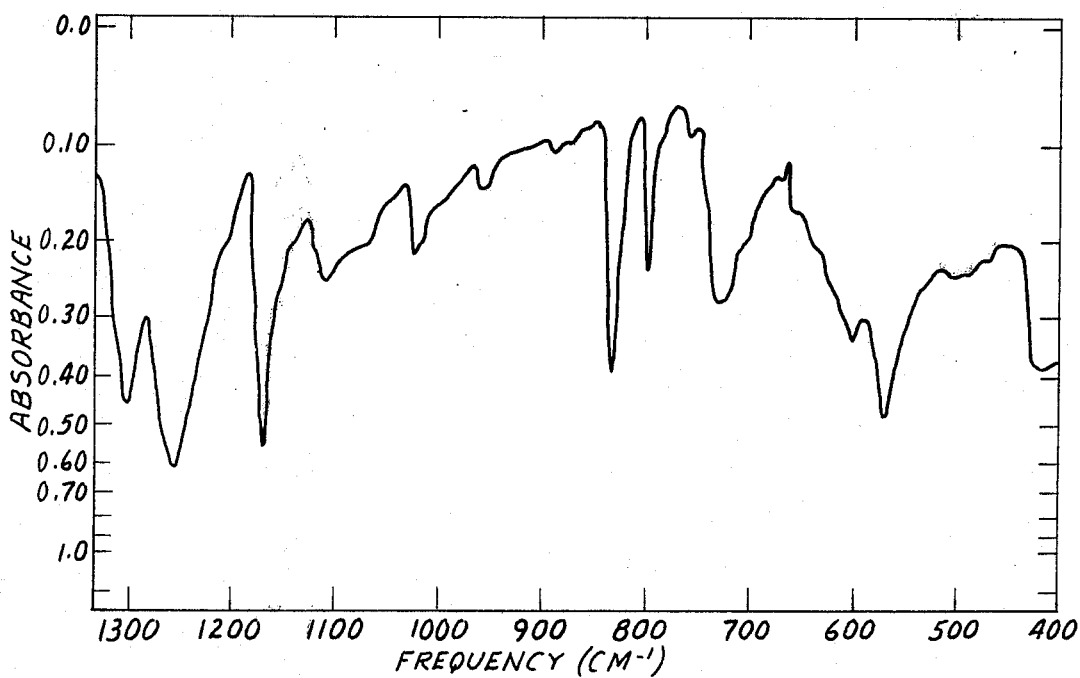

FIGS. 9 and 10 show the infra red absorption curve for 1,4-bis(p-n-octyloxybenzylidene amino)anthraquinone.

Figure 2:
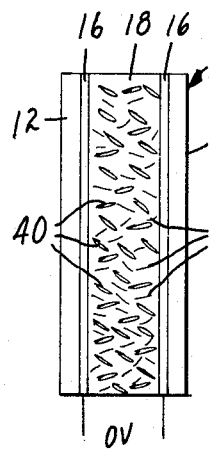
FIG. 2 shows in diagrammatic fashion a homeotropic guest-host combination of the invention in the quiescent state with no impressed voltage.
Figure 3:
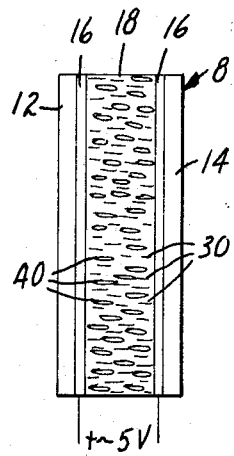
FIG. 3 shows the homeotropic guest-host combination of FIG. 2 with impressed voltage.
Figure 11:
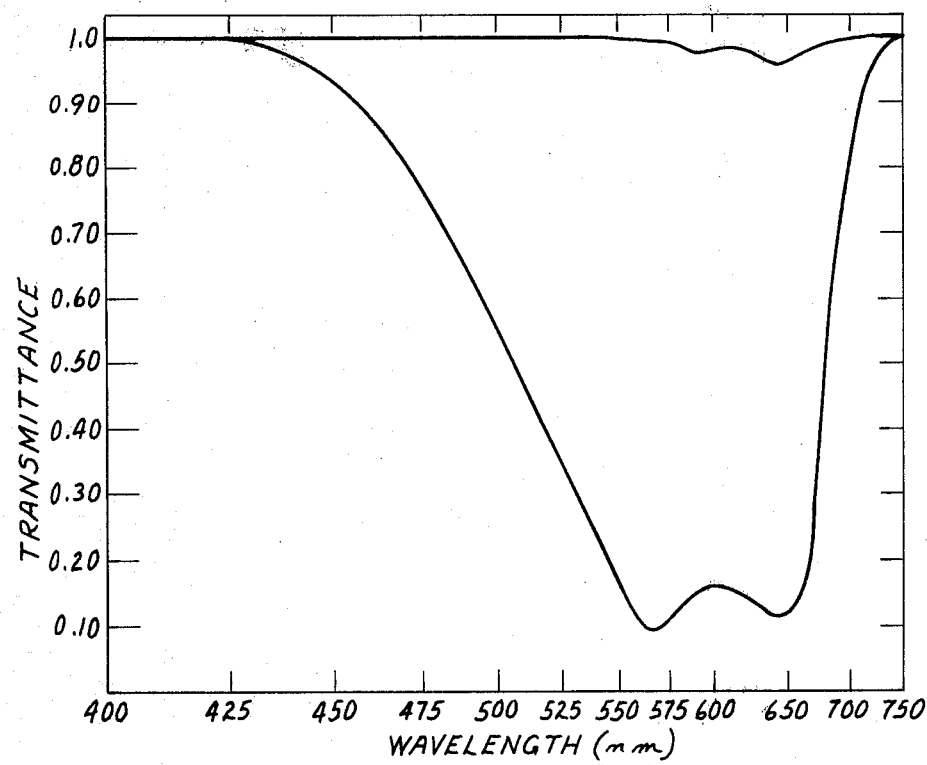

FIG. 11 shows transmittance curves of 5% solution of 1,4-bis(p-n-octylbenzylidene amino)anthraquinone dissolved in positive anisotropic nematic liquid crystal (4-cyano-4'-n-pentylbiphenyl) with and without impressed voltage as in FIGS. 2 and 3, etc.

Figure 12:
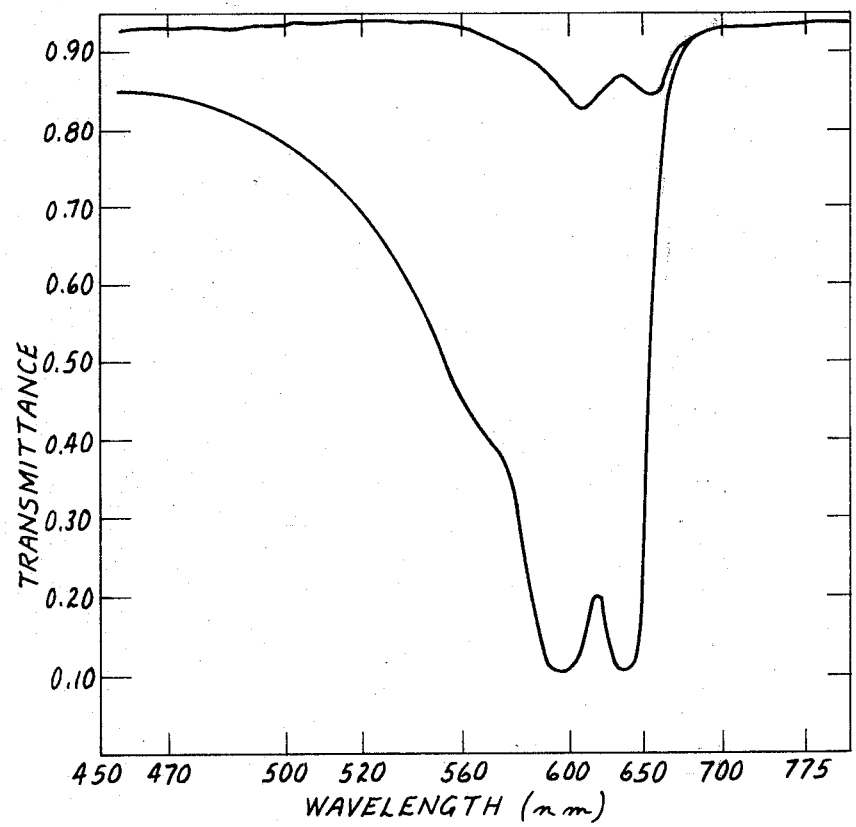

FIG. 12 shows transmittance curves of a 5% solution of 1,4-bis(p-n-hexylbenzylidene amino)anthraquinone in a composite nematic host.

Figure 13:
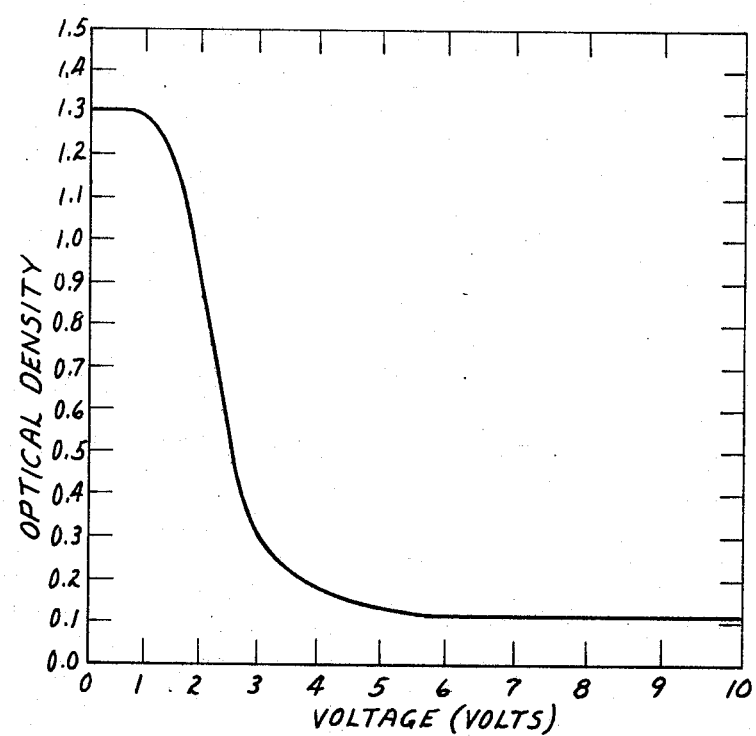
Figure 14:
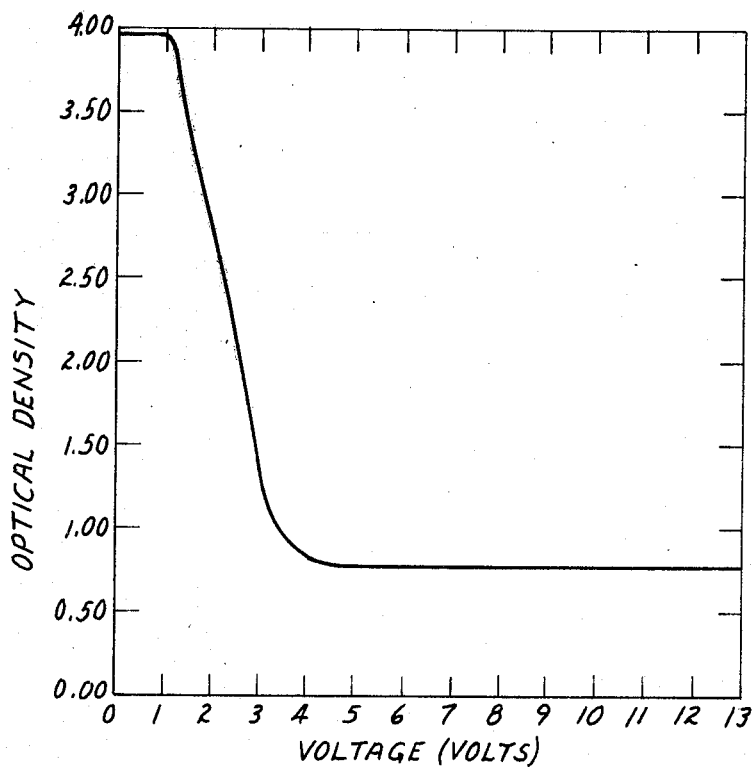

FIGS. 13 and 14 show decrease in optical density (ordinates) with increasing impressed voltage (abscissae) solutions of the dye of FIG. 11 in N-p-(n-hexylbenzylidene)-p'-aminobenzonitrile at 5 and 33% concentration respectively.

Figure 1:
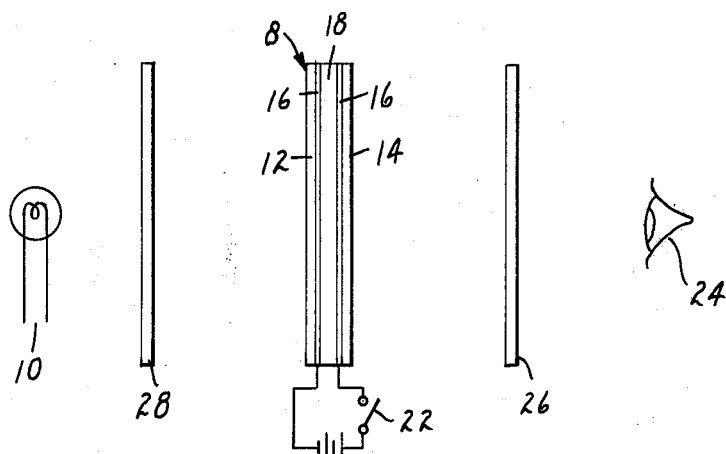
FIG. 1 shows diagrammatically an electro-optical valve device employing guest-host combinations of pleochroic dyes of the invention.

In FIG. 1 a cell (8) is shown having walls (12) and (14) inwardly coated with conductive coatings of tin and/or indium oxide (16) and containing guest-host combination (18) of positive anisotropic nematic liquid crystal and pleochroic dye (not indicated in this figure). Cell (8) is placed between light source (10) and observer (24) with polarizer (28) and, for certain uses, analyzer (26). Cell (8) is provided with a source of direct current (20) shown as a battery but any source is the equivalent thereof. The source of current is connected to coatings (16) of the cell with switch (22) interposed.

FIGS. 2 and 3 show an enlarged view of the end of cell (8) with diagrammatic representation of the molecules of nematic liquid crystalline material (30) and dissolved pleochroic dye (40). The cell walls of FIGS. 2 and 3 have been treated as described above so that homeotropic orientation occurs when a voltage is applied as indicated in FIG. 3 and molecules (30) and (40) tend to orient at right angles to the walls as shown.

The cell of FIGS. 4 and 5 is shown in facial view. The inner cell walls have been oriented in parallel arrangement as described herein suitably by coating with MgF$_2$ at a low angle over the tin and/or indium oxide. The orientation of FIG. 4 with O impressed voltage is changed by an applied voltage of about 5 volts and molecules (30) and (40) align with the field as shown in FIG. 5.

FIGS. 6, 7 and 8 shows the behavior in a cell with twisted oreintation. The cells walls are as for FIGS. 4 and 5 but with orientation in a vertical direction at the rearward wall and horizontally at the forward wall with no impressed voltage. When a voltage is impressed as in FIGS. 7 and 8 it is seen that molecules are oriented with the field. In FIG. 6 a portion of cell and contents are cut away to show orientation on the rearward wall.

FIGS. 9 and 10 show parts of the infrared spectrum of the compound of Example 19 as referred to in Example 24 below with absorbance as ordinates and frequency (cm$^{-1}$) as abscissae.

FIG. 11 shows transmittance curves of a cell as shown in above Figures containing a guest-host combination which is a 5% solution of 1,4-bis(p-n-octyloxybenzylidene amino)anthraquinone in 4-cyano-4-n-pentylbiphenyl. The upper curve is with impressed voltage, transmittance is ordinates and wavelengths (nm) abscissae in this and following figure.

FIG. 12 shows transmittance curves for a 5% solution of 1,4-bis(p-n-hexylbenzylidene amino)anthraquinone in a composite host composed of 10% p-hexyloxybenzylidene-p'-aminobenzonitrile, 32.7% p-ethoxybenzylidene-p'-n-butylaniline and 57.3% p-methoxybenzylidene-p'-n-butylaniline having net positive anisotropy.

FIGS. 13 and 14 show the variation of optical density as ordinates with impressed voltage as abscissae for solutions of 1,4-bis(octyloxybenzylidene amino)anthraquinone in N-p-(-n-hexylbenzylidene-p'-aminobenzonitrile at 5% and 33% concentrations respectively. These can serve as optical shutters in electro-optical devices.

As indicated above it is necessary in forming guest-host combinations of the invention to employ dielectrically positive anisotropic nematic compounds or compositions. Included in typical compounds with positive anisotropy are the following with temperature at which conversion of crystalline to nematic state (C→N) and nematic to isotropic state (N→I) occurs:

Table 1

|  | C→N | N→I |
| --- | --- | --- |
| N-p-n-hexylbenzylidene-p'-aminobenzonitrile | — | 51.5–52.5 |
| N-p-[(p-methoxybenzylidene)-amino]benzonitrile | 105 | 125 |
| N-p-[(ethoxybenzylidene)-amino]benzonitrile | 106 | 118 |
| N-p-cyanobenzylidene-p'-n-butoxyaniline | 70 | 93 |
| N-p-cyanobenzylidene-p'-octyloxyaniline | 83* | 107 |

*Smectic to nematic transition

Other useful positive anisotropic nematic liquid crystals are included in compounds

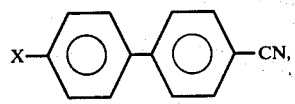

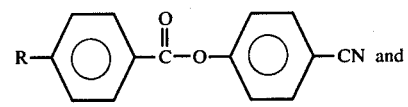

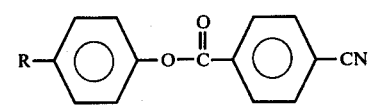

wherein R = alkyl or alkoxy of 1-7 carbon and X is alkyl or alkoxy of 1-9 carbon atoms.

Eutectic mixtures and combinations of all the above are also useful. Illustrative eutectic mixtures of 4'-substituted 4-cyano-4'-alkyl biphenyls are included in Table 2.

Table 2

| 4'sub | comp (Mol%) | °C. C→N | °C. N→I |
| --- | --- | --- | --- |
| nC$_5$H$_{11}$ | 59 | 3 | 37.5 |
| nC$_7$H$_{15}$ | 41 | | |
| nC$_5$H$_{11}$ | 55 | 0 | 57.5 |
| nC$_5$H$_{11}$O | 15 | | |
| nC$_7$H$_{15}$O | 13 | | |
| nC$_8$H$_{17}$O | 17 | | |
| nC$_7$H$_{17}$ | 36 | 0 | 61 |
| nC$_3$H$_7$O | 18 | | |
| nC$_5$H$_{11}$O | 15 | | |
| nC$_7$H$_{15}$O | 12 | | |
| nC$_8$H$_{17}$O | 12 | | |

The above compounds with positive anisotropy can be employed with compounds such as representative species of several useful groups of nematic liquid crystals with negative anisotropy shown in Table 3.

Table 3

|  | °C. C→N | I |
| --- | --- | --- |
| N-p-methoxybenzylidene-p'-n-butylaniline | 19 | 45 |
| p-[N-(p-methoxybenzylidene)-amino]-phenylbenzoate | 120 | 166 |
| N-p-methoxybenzylidene-p'-aminophenylacetate | 79 | 102 |
| p-azoxyanisole | 119 | 133 |
| p-n-butylbenzoic acid p'-n-hexyloxyphenyl ester | 56 | 87 |
| butyl-p-(p'-ethoxyphenoxycarbonyl)phenylcarbonate | 73 | 127 |
| p(p'-ethoxyphenylazo)phenyl heptanoate | 73 | 127 |
| p(p'-ethoxyphenylazo)phenyl undecylenate | 64 | 107 |
| p-methoxybenzylidene-p'-butylaniline | 20 | 44.5 |
| N-(p-butyoxybenzylidene)-p'-pentylaniline | 41 | 80 |
| p-ethoxybenzylidene-p'-n-butylaniline | 38 | 78–9 |

Some groups of included compounds are

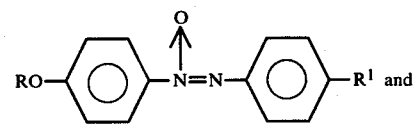

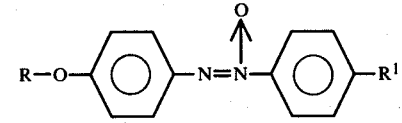

wherein R and R$^1$ are lower alkyl of C$_1$-C$_4$;

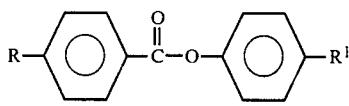

wherein R is alkyl of $C_1$-$C_7$ and $R^1$ is alkoxy of $C_1$-$C_7$ or wherein R is alkoxy of $C_1$-$C_7$ and $R^1$ is alkyl $C_1$-$C_7$;

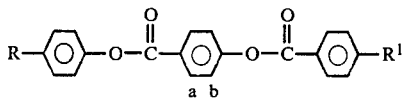

wherein R and $R^1$ are alkyl of $C_1$-$C_7$ and a or b are H or one can be Cl.

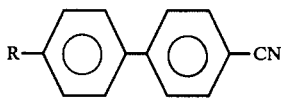

wherein R is alkyl or alkoxy of 1 to 10 carbon atoms and eutectic mixtures of such compounds. When combined nematic compounds of Table 3 are with those of Tables 1 or 2 the combinations must have a net positive anisotropy. This may be achieved using only relatively low percentages of materials with high positive anisotropy when the other materials have relatively low negative anisotropy. Such combinations include, for example, A and B shown in Table 4, as percentages, both of which are nematic from at least $-10°$ C. to $+50°$ C.

Table 4

|  | A | B |
|---|---|---|
| N-p-methoxybenzylidene-p'-n-butylaniline, | 57.3 | 51 |
| N-p-ethoxybenzylidene-p'-n-butylaniline and | 32.7 | 29 |
| N-p-hexylbenzylidene-p'-aminobenzonitrile. | 10.0 | 20 |

The bis anils of the invention are prepared from 1,4- or 1,8-diaminoanthraquinones, particularly without other substituents, as illustrated below. The appropriate diamino anthraquinone is condensed with an aromatic aldehyde having suitable p-substituent, e.g., p-alkyl or p-alkoxy, by the basic procedures of the following examples to provide bis anils of the invention. Herein temperatures are in degrees centigrade, melting points are determined on a Kahn Electro-thermal Melting Point Apparatus in a capillary tube on a heated block with National Bureau of Standards calibrated thereometer (uncorrected).

EXAMPLE 1

In a round-bottomed flask fitted with thermometer, reflux condenser and stirrer is placed a mixture of 25 ml. glacial acetic acid and 50 ml methanol and in it is dissolved 2.38 g (0.1 mol) 1,4-diaminoanthraquinone. There is then added 4.68 g (0.2 mol) p-octyloxybenzaldehyde and the mixture is heated at 90° for one hour. The reaction mixture is cooled to about 20°-25° and poured into ice water. The precipitated product is collected and recrystallized from ethylene glycol monomethyl ether or 1:1 methanol water as small purple needles. The crystallization is repeated twice more to obtain 1,4-bis(p-octyloxybenzylidene amino)anthraquinone m.b. 280° (dec) having absorption spectra in visual and infra red ranges as shown in FIGS. 9, 10 and 11 and of sufficient purity for use in guest-host combinations.

Analysis: Calculated for $C_{44}H_{54}N_2O_4$; 78.3%C, 8.06%H, 4.15%N: found 77.61%C, 7.46%H, 4.18%N.

EXAMPLE 2

To a stirred solution at 80° C. of 2.38g (0.1 mol) 1,8-diaminoanthraquinone in 3.16 g (0.2 mol) p-n-butylbenzaldehyde is added about 1 ml. glacial acetic acid. Heating is continued for one hour and 50 ml methanol is added to dissolve the reaction mixture. The solution is poured into 100 ml ice water and the product collected and recrystallized from 1:1 methanol-water as above to give 1,8-bis(p-n-butylbenzylidene amino)anthraquinone as fine purple needles, melting with decomposition at 288°-9° C.

In order to determine the optical order parameter a cell is constructed to provide orientation of a host nematic medium. Two glass plates 5 mm thick and about 5×7 cm are cleaned thoroughly by washing successively in acid, alcohol, aqueous ammonia and distilled water and dried at 65° C. in an oven. Each plate is then coated on one surface by vapor deposition of indium oxide which makes the surface electrically conductive. The indium oxide surfaces are oriented, i.e. rendered anisotropic, by unidirectional rubbing under slight moderate pressure for about 20 strokes with a cotton pad impregnated with an aqueous suspension of zirconium oxide. Each plate is carefully rinsed with distilled water, placed on edge in an oven and dried for one hour at 65° C. Two strips of polytetrafluoroethylene sheets about 12μ thick are cut about 5 cm long and applied to the oriented surface of one plate at a distance of about 5 cm and the other plate applied with orientation directions of the two plates at right angles. The assembly is then fastened together.

A solution of the pleochroic dye to be tested is prepared by warming about 0.5 g (10 drops) of the nematic combination of Table 4 to 65° C. (i.e., above the isotropic melting temperature) and dissolving about 50 mg of the dyestuff therein. This should provide an optical density of approximately 2 at 655 nm. With the solution still above the isotropic melting point one edge of the cell is applied to the dyestuff solution which is drawn up to fill the cell by capillary action. After cooling for a period of time the temperature of the solution drops below the isotropic point into the nematic region and testing can continue.

Electrical contacts are made to the indium oxide coatings on the exposed ends of the glass plates forming the cell using alligator clips and these are connected to a switching circuit including a source of low voltage direct current capable of providing 50-100 microamperes over the range of 0.8 to 10 volts or of sufficiently high fixed voltage. The cell is then placed in the sample beam of a spectrophotometer (such as Perkin Elmer Model 350) having polarizing filters in both reference and sample beams and parallelly arranged analyzers. The filters give a neutral gray color when crossed. The transmittance is scanned over the range of 400-750 nm. and recorded graphically with no voltage applied to the cell (switch off) and with a voltage exceeding the threshold for the particular host (switch on). The resulting graphs generally resemble those shown in FIG. 11 in which the upper curve represents excellent transmittance (low absorption) at the peaks at 565 and 640 nm with no impressed voltage, and the lower curve shows extensive absorption with impressed voltage. Values of S are calculated from these transmission (or absorption)

curves as explained herein above. A similar device is employed as a shutter for a camera, using sufficiently high concentrations of dyestuff to provide substantially complete exclusion of light to substantial transparency with changing electrical field. The behavior as a shutter is illustrated by FIG. 13 and FIG. 14. The residual color can be corrected when necessary by addition of suitable filters.

The procedures of Examples 1 and/or 2 are repeated employing appropriate amounts of aromatic aldehydes having various substituents and the various bis anils are tested for efficiency as guests in guest-host combinations using concentrations of 1% in 4-pentyloxy-4'-cyanobiphenyl and calculating values of the optical order parameter S as described above. In Table 5 are shown examples of compounds of the invention prepared by the above procedure indicating the substituent R in the para-position of the phenyl group melting points in °C. (all with decomposition) and the value of S determined by the above procedure. Each substance shows pleochroism between blue and substantially colorless except the 1,8-substituted anthraquinones which are between reddish and colorless. Alkyl groups are straight chain (normal) unless otherwise indicated and substituents are in the 1,4-positions except where noted.

Table 5

| Example | R group | m.p. | S |
|---------|---------|------|------|
| 3 | —CH$_3$ | 273 | 0.58 |
| 4 | —C$_2$H$_5$ | 270 | 0.79 |
| 5 | —C$_4$H$_9$* | 288 | 0.65 |
| 6 | —CH$_2$CH(CH$_3$)$_2$ | 268 | 0.81 |
| 7 | —C$_5$H$_{11}$ | 270 | 0.83 |
| 8 | —C$_6$H$_{13}$ | 272 | 0.85 |
| 9 | —C$_7$H$_{15}$ | 273 | 0.86 |
| 10 | —C$_8$H$_{17}$ | 275 | 0.91 |
| 11 | —C$_8$H$_{17}$* | 292 | 0.78 |
| 12 | —C$_{10}$H$_{21}$ | 279 | 0.70 |
| 13 | —C$_{10}$H$_{21}$* | 294 | 0.68 |
| 14 | —C$_{16}$H$_{31}$ | 281 | 0.80 |
| 15 | —OCH$_3$ | 281 | 0.60 |
| 16 | —OC$_2$H$_5$ | 270 | 0.70 |
| 17 | —OC$_5$H$_{11}$ | 272 | 0.83 |
| 18 | —OC$_6$H$_{13}$ | 274 | 0.87 |
| 19 | —OC$_6$H$_{13}$* | 296 | 0.75 |
| 20 | —OC$_7$H$_{15}$ | 276 | 0.90 |
| 21 | —OC$_8$H$_{17}$ | 280 | 0.93 |
| 22 | —OC$_8$H$_{17}$* | >300 | 0.85 |
| 23 | —C$_6$H$_5$ | 265 | 0.79 |
| 24 | —N(CH$_3$)$_2$ | 246 | 0.72 |
| 25 | —NO$_2$ | 240 | 0.69 |
| 26 | —CN | 256 | 0.75 |

*1,8-bis substituted anthraquinone.

EXAMPLE 24

Infrared spectra are determined on solutions of various compounds of the invention of Examples 1–23 in dispersion using a greating infra red spectrometer (Perkin Elmer 337) and slow scan in KBr. It is found that all compounds show stretch absorption at 2950–2800 cm$^{-1}$ and 3375 cm$^{-1}$ frequencies. More characteristic absorption patterns are shown in the shorter frequencies. Some of the characteristic bands below 1300 cm$^{-1}$ are given in Table 6 for above compounds. The curve for the compound of Example 1 (R = OC$_8$H$_{17}$) is shown in FIG. 10.

Table 6

| Example | R | Bands and Peaks |
|---------|-----|---|
| — | OCH$_3$ | 1150–1250, 1095, 1010, 810–860, 760, 750, 635, 600, 590, 510, |
| 16 | OC$_2$H$_5$ | 1150, 1110, 1040, 780, 770, 650, 615 |
| 17 | OC$_5$H$_{11}$ | 1150, 1070, 1000, 980, 970, 870, 780, 770, 670, 650. |

Table 6-continued

| Example | R | Bands and Peaks |
|---------|-----|---|
| 20 | OC$_7$H$_{15}$ | 1290, 1250, 1150, 1100, 1010, 825, 725, 645, 615, 505. |
| — | CH$_3$ | 1200, 1100, 1010, 825, 750, 590, 475 |
| 2 | C$_4$H$_9$ | 1150–1250, 1100, 980, 905, 860, 780, 770, 650, 510 |
| 7 | C$_5$H$_{11}$ | 1150, 1110, 1010, 900, 870, 705, 550, 500 |
| 10 | C$_8$H$_{17}$ | 1150, 1050, 950, 880, 720, 525 |

EXAMPLE 25

A reflecting electro-optical cell is made by filling an electric field cell with compositions which is nematic with high positive anisotropy at ambient temperatures, a means of eliminating the necessity for an external polarizer and a dye with very high optical order parameter and suitable means for providing the desired surface boundary conditions such as surfaces coated at an angle with MgF$_2$ as described above in connection with FIGS. 4 and 5. A suitable combination is a mixture of equal parts by weight of N-p-butoxy-, N-p-hexyloxy-, and N-p-octanoyloxy-benzylidineaminobenzonitriles to which is added 5–10% by weight of an optically active nematic material such as the active amyl ester of cyanobenzylideneaminocinnamic acid. This addition provides a cholesteric host material and enables the dye to efficiently absorb both polarizations of light in the relaxed state. In an applied field the cholesteric host undergoes a phase transition into a nematic state with homeotropic alignment. In this state the dye molecules are aligned parallel to the incident light and are not absorbing.

What is claimed is:

1. A pleochroic dyestuff of the general formula

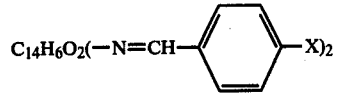

where C$_{14}$H$_6$O$_2$ is an anthraquinone radical having valences at 1,4 or 1,8 and X is nitro, cyano, phenyl, alkyl of 1–20 carbon atoms, alkoxy of 1–20 carbon atoms or di(lower alkyl)amino containing alkyl groups of 1–4 carbon atoms.

2. The pleochroic dyestuff according to claim 1 represented by the structure

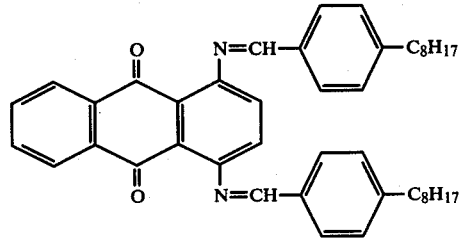

3. The pleochroic dyestuff according to claim 1 represented by the structure

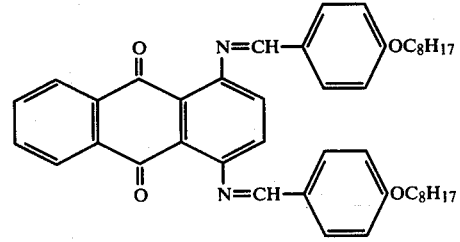

* * * * *